No. 755,041. PATENTED MAR. 22, 1904.
B. PETERMAN.
COFFEE URN.
APPLICATION FILED MAY 13, 1903.
NO MODEL. 2 SHEETS—SHEET 2.
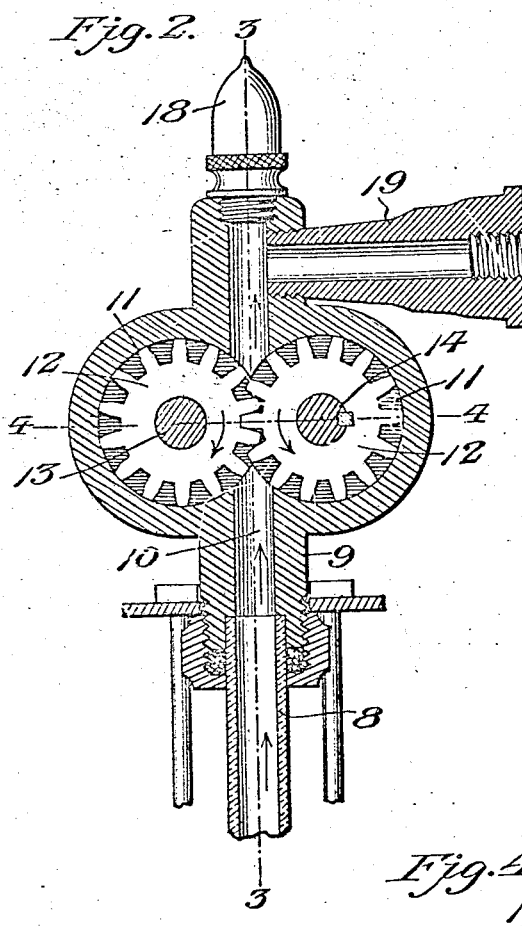
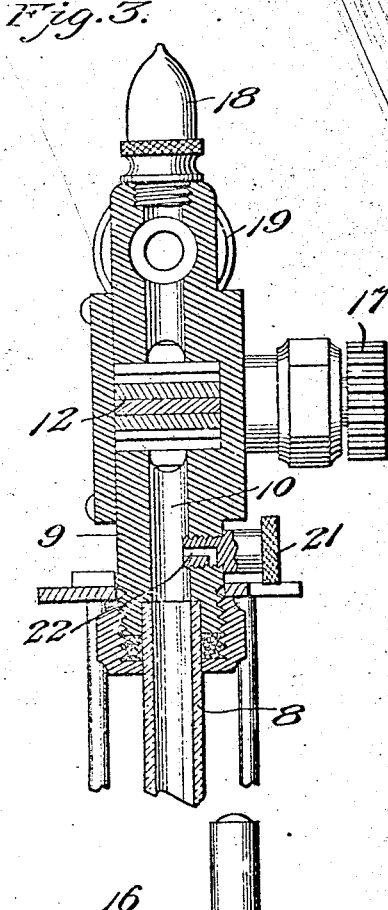
Inventor
Bert Peterman
Witnesses
Edwin G. McKee
Herbert D. Lawson
By Victor J. Evans
Attorney No. 755,041.

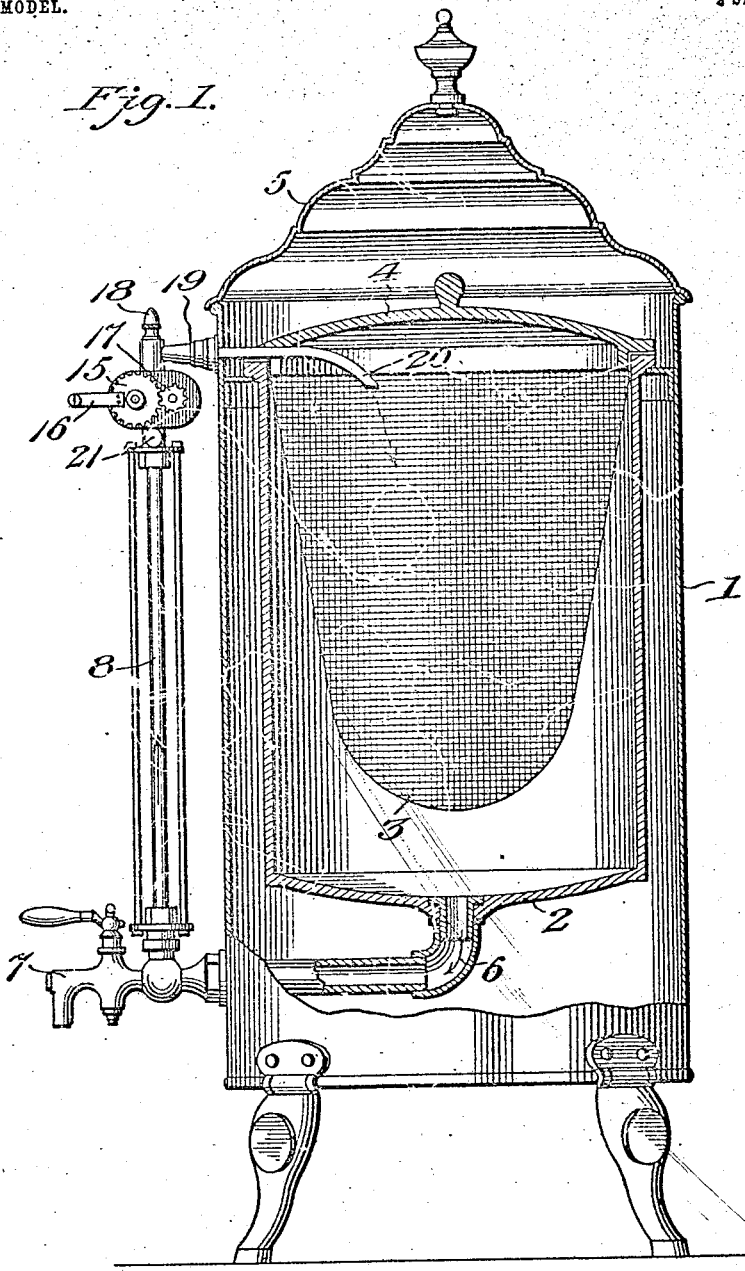

Patented March 22, 1904.

UNITED STATES PATENT OFFICE.

BERT PETERMAN, OF DALLAS, TEXAS.

COFFEE-URN.

SPECIFICATION forming part of Letters Patent No. 755,041, dated March 22, 1904.

Application filed May 13, 1903. Serial No. 156,963. (No model.)

*To all whom it may concern:*

Be it known that I, BERT PETERMAN, a citizen of the United States, residing at Dallas, in the county of Dallas and State of Texas, have invented new and useful Improvements in Coffee-Urns, of which the following is a specification.

My invention relates to new and useful improvements in pump attachments for coffee-urns by means of which coffee may be circulated through an urn.

The object of the invention is to provide a pump mounted within a suitable casing which may be readily attached to an urn and to the gage ordinarily employed, and this pump is adapted to be turned in any suitable manner to draw liquid through the gage and discharge it into the top of the urn.

In the general method of making coffee after the boiling water has been poured through the coffee-mash it is drawn off through the faucet in a cup or like open utensil and poured back into the urn to pass again through the mash, thereby extracting the full strength of the coffee. This is repeated several times. This process necessitates the removal of the urn's cover, thereby allowing the escape of considerable steam, which carries with it a great deal of the aroma. By my device the escape of steam is prevented, thereby greatly enhancing the quality of the coffee.

With the above and other objects in view the invention consists in providing a pump-casing adapted to be attached in any suitable manner to one end of a gage, and within this casing are revolubly mounted two meshing pistons, adapted to be operated by an arrangement of gears upon the casing. These pistons when turned serve to force liquid upward through an outlet in the casing, and a discharge-pipe is connected to this outlet and opens through the upper portion of the urn. A vent is provided within the casing, so as to permit the admission of air, whereby when it is desired the liquid within the gage can be returned to its natural level.

The invention also consists in the novel construction and arrangement of parts hereinafter more fully described and claimed, and illustrated in the accompanying drawings, in which—

Figure 1 is a section through an urn and showing my improved pump attachment in elevation. Fig. 2 is an enlarged vertical section through the pump. Fig. 3 is section on line 3 3, Fig. 2; and Fig. 4 is a section on line 4 4, Fig. 2.

Referring to the drawings by numerals of reference, 1 is a coffee-urn of ordinary construction having a coffee-receptacle 2, within which is arranged a straining-sack 3. A stone cover 4 is provided for receptacle 2, and an outer cover 5 is arranged over the outer casing 1. An outlet-pipe 6 extends laterally from the urn and is adapted to convey coffee from receptacle 2 to a faucet 7, located at the outer end of pipe 6. A glass gage 8 of ordinary construction extends upward from the pipe 6, and its upper end projects into the lower end of a pump-casing 9. A longitudinally-extending passage 10 is arranged within this casing, and at opposite sides of this passage are circular piston-chambers 11, in which are mounted meshing rotary pistons 12, said pistons fitting snugly within the chambers 11. One of the pistons is loosely mounted upon a shaft 13, while the other is secured in any suitable manner to a shaft 14. A large gear 15 is loosely mounted on the shaft 13 and has a crank 16 extending therefrom, whereby it may be readily rotated. Gear 15 meshes with a smaller gear 17, which is secured in any suitable manner to the shaft 14, and it will therefore be obvious that when gear 15 is rotated the piston secured to the shaft 14 will be rapidly revolved and will cause the other piston to rotate therewith. The upper end of passage 10 is normally closed by a screw-plug 18, and a tube 19 extends laterally from and is detachably secured within the casing at a point above the pistons and communicates with the passage 10. This tube is adapted to be fastened in any suitable manner to the urn, and a pipe 20 is detachably secured within the end of tube 19 and projects through the stone cover 4 to a point within the straining-sack 3. A thumb-screw 21 is arranged within the casing 9 at a point below the rotary pistons 12 and has an L-shaped passage 22 therein, which communicates with said passage 10. When the screw 21 is turned in one direction, the outer end of this passage becomes exposed, and air is then free to pass therethrough into or out of the passage 10.

After coffee and water have been placed within the urn, as ordinarily, the crank 16 is rotated so as to impart rotary motion to the pistons 12 in the directions of the arrows shown in Fig. 2. This will cause the liquid to be drawn upward through the gage 8 and around within the circular chambers 11 and up through the tube 19 and pipe 20. This circulation of the coffee will continue as long as the pistons are rotated. After the operation has been completed the thumb-screw 21 may be rotated so as to expose the outer end of passage 22 therein, and air is thus permitted to pass therethrough into the passage 10, so as to return the liquid within the gage to its natural level.

It will be seen that the pump herein described may be readily attached to an ordinary urn, and by means thereof a circulation of coffee may be quickly established.

Having thus described my invention, what I claim as new, and desire to secure by Letters Patent, is—

1. In combination with an urn and its gage, a removable pump attached to said gage whereby a continuous circuit of liquid may be drawn from and into the urn through said gage, and an air-vent connected with the pump to be opened when said pump is not in use to cause the liquid to return to its level.

2. In combination with an urn and its gage, a removable pump-casing at one end of the gage, a channel between the casing and the urn and a pump within the casing whereby a continuous flow of liquid is drawn from the urn and through the channel by way of said gage.

3. In combination with an urn and its gage, a removable pump-casing at one end of the gage, a channel between the casing and the urn, a pump within said casing whereby a continuous circuit of liquid may be drawn from and into the urn by way of the channel through the gage, and an air-vent connected to said pump-casing to be opened when the pump is not in use thereby causing the liquid to return to its level.

In testimony whereof I affix my signature in presence of two witnesses.

BERT PETERMAN.

Witnesses:
 E. G. EISENLOHR,
 L. A. SMITH.